(12) United States Patent
Müller et al.

(10) Patent No.: US 7,008,607 B2
(45) Date of Patent: Mar. 7, 2006

(54) PROCESS FOR PREPARING HYDROGEN PEROXIDE FROM THE ELEMENTS

(75) Inventors: Ulrich Müller, Neustadt/Mussbach (DE); Olga Metelkina, Ludwigshafen (DE); Henrik Junicke, Mannheim (DE); Thomas Butz, Ludwigshafen (DE); Omar M. Yaghi, Ann Arbor, MI (US)

(73) Assignees: BASF Aktiengesellschaft, Ludwigshafen (DE); The Regents of the University of Michigan, Ann Arbor, MI (US)

( * ) Notice: Subject to any disclaimer, the term of this patent is extended or adjusted under 35 U.S.C. 154(b) by 241 days.

(21) Appl. No.: 10/280,013

(22) Filed: Oct. 25, 2002

(65) Prior Publication Data

US 2004/0081611 A1    Apr. 29, 2004

(51) Int. Cl.
   *C01B 15/01* (2006.01)
   *C01B 15/029* (2006.01)

(52) U.S. Cl. ............... 423/584; 502/150; 556/110; 556/136

(58) Field of Classification Search ........... 423/584
   See application file for complete search history.

(56) References Cited

U.S. PATENT DOCUMENTS

| | | | | |
|---|---|---|---|---|
| 4,128,627 A | * | 12/1978 | Dyer et al. ............. | 423/584 |
| 4,207,305 A | * | 6/1980 | Diamond et al. ....... | 423/576.6 |
| 4,336,240 A | * | 6/1982 | Moseley et al. ........ | 423/584 |
| 4,347,232 A | * | 8/1982 | Michaelson ............ | 423/584 |
| 4,792,541 A | * | 12/1988 | Ho et al. ................ | 502/167 |
| 4,831,002 A | * | 5/1989 | Ho et al. ................ | 502/165 |
| 5,480,629 A | * | 1/1996 | Thompson et al. ..... | 423/584 |
| 5,648,508 A |  | 7/1997 | Yaghi | |
| 5,783,164 A | * | 7/1998 | Bianchi et al. ........ | 423/584 |
| 5,976,486 A | * | 11/1999 | Thompson et al. ..... | 423/584 |
| 6,030,917 A | * | 2/2000 | Weinberg et al. ...... | 502/104 |
| 6,143,688 A | * | 11/2000 | Thompson et al. ..... | 502/167 |
| 6,617,467 B1 |  | 9/2003 | Muller et al. | |
| 6,676,919 B1 | * | 1/2004 | Fischer et al. ......... | 423/584 |
| 6,803,474 B1 | * | 10/2004 | Dismukes et al. ...... | 556/20 |
| 2003/0078311 A1 |  | 4/2003 | Muller et al. | |
| 2003/0148165 A1 |  | 8/2003 | Muller et al | |
| 2003/0171623 A1 | * | 9/2003 | Puckette et al. ........ | 568/454 |
| 2004/0097724 A1 |  | 5/2004 | Muller et al. | |
| 2004/0147389 A1 | * | 7/2004 | Green et al. ........... | 502/103 |

FOREIGN PATENT DOCUMENTS

| EP | 0 790 253 | 8/1997 |
|---|---|---|
| WO | WO 97/01113 | 1/1997 |

OTHER PUBLICATIONS

M. O'Keeffe, et al., Journal of Solid State Chemistry, vol. 152, pp. 3-20, "Frameworks For Extended Solids: Geometrical Design Principles", 2000, no month.

H. Li, et al., Letters to Nature, vol. 402, pp. 276-279, "Design and Synthesis of an Exceptionally Stable And Highly Porous Metal-Organic Framework", Nov. 1999.

M. Eddaoudi, et al., Topics in Catalysis, vol. 9, pp. 105-111, "Design and Synthesis of Metal-Carboxylate Frameworks With Permanent Microporosity", 1999, no month.

B. Chen, et al., Science, vol. 29, pp. 1021-1023, "Interwoven Metal-Organic Framework on a Periodic Minimal Surface With Extra-Large Pores", Feb. 9, 2001.

* cited by examiner

*Primary Examiner*—Wayne A. Langel

(57) ABSTRACT

The present invention relates to a process for the preparation of hydrogen peroxide from oxygen or oxygen-delivering substances and hydrogen or hydrogen-delivering substances in the presence of at least one catalyst containing a metal-organic framework material, wherein said framework material comprises pores and a metal ion and an at least bidentate organic compound, said bidentate organic compound being coordinately bound to the metal ion. The invention further relates to a novel material consisting of said metal organic framework material wherein the material is brought in contact with at least one additional metal.

11 Claims, No Drawings

PROCESS FOR PREPARING HYDROGEN PEROXIDE FROM THE ELEMENTS

BACKGROUND AND SUMMARY OF THE INVENTION

1. Field of the Invention

The present invention relates to a process for preparing hydrogen peroxide from the reaction of oxygen and/or oxygen-delivering substances with hydrogen and/or hydrogen-delivering substances in the presence of a catalyst.

2. Discussion of the Background

Most hydrogen peroxide produced commercially is obtained via the anthraquinone process involving the oxidation of an anthra-hydroquinone in the presence of air (yielding the hydrogen peroxide) and the recycling reaction of reducing the resulting anthraquinone to anthra-hydroquinone in the presence of a noble metal catalyst, most commonly Pd. A catalyst free of noble metals is described in WO 97/01113. The formation of hydrogen peroxide from the elements is not of significant commercial importance at this point. However, for specific applications, e.g. in electronics, ultrapure hydrogen peroxide is required. In this context, producing hydrogen peroxide from the elements may be cost-effective over working-up and cleaning hydrogen peroxide obtained by the anthraquinone process.

In a promising novel and alternative strategy to create micro- and/or mesoporous catalytically active materials in general, metal ions and molecular organic building blocks are used to form so-called metal-organic frameworks (MOFs). The metal-organic framework materials as such are described, for example, in. U.S. Pat. No. 5,648,508, EP-A-0 709 253, M. O'Keeffe et al., *J. Sol. State Chem.*, 152 (2000) p. 3–20, H. Li et al., *Nature* 402 (1999) p. 276 seq., M. Eddaoudi et al., *Topics in Catalysis* 9 (1999) p. 105–111, B. Chen et al., *Science* 291 (2001) p. 1021–23.

Among the advantages of these novel materials, in particular for applications in catalysis, are the following:

(i) larger pore sizes can be realized than for the zeolites used presently;
(ii) the internal surface area is larger than for porous materials used presently;
(iii) pore size and/or channel structure can be tailored over a large range;
(iv) the organic framework components forming the internal surface can be functionalized easily;
(v) the metal-organic framework according to the invention is stable even if no host, solvent or any other additional substance is present, i.e. the framework does not collapse and/or interpenetrate and/or change its shape and dimension. This puts the material according to the invention in contrast to other metal-organic materials that maybe used as catalysts.

However, these novel porous materials have only been described as such. The use of these catalytically active materials for the reaction of hydrogen and oxygen to form hydrogen peroxide has not been disclosed yet. In related applications, the use of these novel porous materials as shaped bodies (U.S. application Ser. No. 10/157,182) and for epoxidation reactions (U.S. application Ser. No. 10/157,494) has been described.

SUMMARY OF THE INVENTION

It is an object of the present invention to provide a process and a catalyst for the reaction of oxygen and/or oxygen-delivering substances with hydrogen and/or hydrogen-delivering substances, wherein the catalyst for said reaction contains a novel material, in addition to, or instead of, catalytic materials according to the prior art.

This object is solved by providing a process for the reaction of oxygen and/or oxygen-delivering substances with hydrogen and/or hydrogen-delivering substances in the presence of a catalyst, wherein said catalyst contains a metal-organic framework material comprising pores and at least one metal ion and at least one at least bidentate organic compound, which is coordinately bound to said metal ion, and wherein said framework material retains its dimension and shape even while no other materials are present.

DETAILED DESCRIPTION OF THE INVENTION

As has been mentioned above, metal-organic framework materials as such are described in, for example, U.S. Pat. No. 5,648,508, EP-A-0 709 253, M. O'Keeffe et al., *J. Sol. State Chem.*, 152 (2000) p. 3–20, H. Li et al., *Nature* 402 (1999) p. 276 seq., M. Eddaoudi et al., *Topics in Catalysis* 9 (1999) p. 105–111, B. Chen et al., *Science* 291 (2001) p. 1021–23. An inexpensive way for the preparation of said materials is the subject of DE 10111230.0. The content of these publications, to which reference is made herein, is fully incorporated in the content of the present application.

The catalyst used in the present invention contains at least one metal-organic framework material, for example one of the materials described below.

The metal-organic framework materials, as used in the present invention, comprise pores, particularly micro- and/or mesopores. Micropores are defined as being pores having a diameter of 2 nm or below and mesopores as being pores having a diameter in the range of above 2 nm to 50 nm, respectively, according to the definition given in *Pure Applied Chem.* 45, p. 71 seq., particularly on p. 79 (1976). The presence of the micro- and/or mesopores can be monitored by sorption measurements for determining the capacity of the metal-organic framework materials to take up nitrogen at 77 K according to DIN 66131 and/or DIN 66134.

For example, a type-I-form of the isothermal curve indicates the presence of micropores {see, for example, paragraph 4 of M. Eddaoudi et al., *Topics in Catalysis* 9 (1999)}. In a preferred embodiment, the specific surface area, as calculated according to the Langmuir model (DIN 66131, 66134) is above 5 $m^2/g$, preferably above 10 $m^2/g$, more preferably above 50 $m^2/g$, particularly preferred above 500 $m^2/g$ and may increase into the region of to above 3000 m2/g.

As to the metal component within the framework material that is to be used according to the present invention, particularly to be mentioned are the metal ions of the main group elements and of the subgroup elements of the periodic system of the elements, namely of the groups Ia, IIa, IIIa, IVa to VIIIa and Ib to VIb. Among those metal components, particular reference is made to Mg, Ca, Sr, Ba, Sc, Y, Ti, Zr, Hf, V, Nb, Ta, Cr, Mo, W, Mn, Re, Fe, Ru, Os, Co, Rh, Ir, Ni, Pd, Pt, Cu, Ag, Au, Zn, Cd, Hg, Al, Ga, In, Tl, Si, Ge, Sn, Pb, As, Sb, and Bi, more preferably to Zn, Cu, Ni, Pd, Pt, Ru, Rh and Co. As to the metal ions of these elements, particular reference is made to: $Mg^{2+}$, $Ca^{2+}$, $Sr^{2+}$, $Ba^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3}$, $Co^{2+}$, $Rh^{2+}$, $Ir^{2+}$, $Ni^{2+}$, $Ni^{+}$, $Pd^{2+}$, $Pd^{+}$, $Pt^{2+}$, $Pt^{+}$, $Cu^{2+}$, $Cu^{+}$, $Ag^{+}$, $Au^{+}$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^{+}$, $Sb^{5+}$, $Sb^{+}$, $Bi^{5+}$, $Bi^{3+}$, and $Bi^{+}$.

With regard to the preferred metal ions and further details regarding the same, particular reference is made to: EP-A 0 790 253, particularly to p. 10, 1. 8–30, section "The Metal Ions", which section is incorporated herein by reference. In the context of the present invention, Zn is particularly preferred as the metal component.

In addition to the metal salts disclosed in EP-A 0 790 253 and U.S. Pat. No. 5,648,508, other metallic compounds can be used, such as sulfates, phosphates and other complex counter-ion metal salts of the main- and subgroup metals of the periodic system of the elements. Metal oxides, mixed oxides and mixtures of metal oxides and/or mixed oxides with or without a defined stoichiometry are preferred. All of the above mentioned metal compounds can be soluble or insoluble and they may be used as starting material either in form of a powder or as a shaped body or as any combination thereof.

As to the at least bidentate organic compound, which is capable to coordinate with the metal ion, in principle all compounds can be used which are suitable for this purpose and which fulfill the above requirements of being at least bidentate. Said organic compound must have at least two centers, which are capable to coordinate with the metal ions of a metal salt, particularly with the metals of the aforementioned groups. With regard to the at least bidentate organic compound, specific mention is to be made of compounds having i) an alkyl group substructure, having from 1 to 10 carbon atoms, ii) an aryl group substructure, having from 1 to 5 phenyl rings, iii) an alkyl or aryl amine substructure, consisting of alkyl groups having from 1 to 10 carbon atoms or aryl groups having from 1 to 5 phenyl rings, said substructures having bound thereto at least one at least bidentate functional group "X", which is covalently bound to the substructure of said compound, and wherein X is selected from the group consisting of $CO_2H$, $CS_2H$, $NO_2$, $SO_3H$, $Si(OH)_3$, $Ge(OH)_3$, $Sn(OH)_3$, $Si(SH)_4$, $Ge(SH)_4$, $Sn(SH)_3$, $PO_3H$, $AsO_3H$, $AsO_4H$, $P(SH)_3$, $As(SH)_3$, $CH(RSH)_2$, $C(RSH)_3$, $CH(RNH_2)_2$, $C(RNH_2)_3$, $CH(ROH)_2$, $C(ROH)_3$, $CH(RCN)_2$, $C(RCN)_3$, wherein R is an alkyl group having from 1 to 5 carbon atoms, or an aryl group consisting of 1 to 2 phenyl rings, and $CH(SH)_2$, $C(SH)_3$, $CH(NH_2)_2$, $C(NH_2)_2$, $CH(OH)_2$, $C(OH)_3$, $CH(CN)_2$ and $C(CN)_3$.

Particularly to be mentioned are substituted or unsubstituted, mono- or polynuclear aromatic di-, tri- and tetracarboxylic acids and substituted or unsubstituted, aromatic, at least one hetero atom comprising aromatic di-, tri- and tetracarboxylic acids, which have one or more nuclei. Preferred bidendate organic compounds in the context of the present invention are alkyl group substructures with at least two carboxy groups and/or aryl groups with one or two phenyl rings having at least two carboxy groups.

A preferred ligand is 1,3,5-benzene tricarboxylate (BCT). Further preferred ligands are ADC (acetylene dicarboxylate), NDC (naphtalen dicarboxylate), BDC (benzene dicarboxylate), ATC (adamantane tetracarboxylate), BTC (benzene tricarboxylate), BTB (benzene tribenzoate), MTB (methane tetrabenzoate) and ATB (adamantane tribenzoate).

Besides the at least bidentate organic compound, the framework material as used in accordance with the present invention may also comprise one or more mono-dentate ligand(s), which is/are preferably selected from the following mono-dentate substances and/or derivatives thereof:

a. alkyl amines and their corresponding alkyl ammonium salts, containing linear, branched, or cyclic aliphatic groups, having from 1 to 20 carbon atoms (and their corresponding ammonium salts);

b. aryl amines and their corresponding aryl ammonium salts having from 1 to 5 phenyl rings;

c. alkyl phosphonium salts, containing linear, branched, or cyclic aliphatic groups, having from 1 to 20 carbon atoms;

d. aryl phosphonium salts, having from 1 to 5 phenyl rings;

e. alkyl organic acids and the corresponding alkyl organic anions (and salts) containing linear, branched, or cyclic aliphatic groups, having from 1 to 20 carbon atoms;

f. aryl organic acids and their corresponding aryl organic anions and salts, having from 1 to 5 phenyl rings;

g. aliphatic alcohols, containing linear, branched, or cyclic aliphatic groups, having from 1 to 20 carbon atoms;

h. aryl alcohols having from 1 to 5 phenyl rings;

i. inorganic anions from the group consisting of: sulfate, nitrate, nitrite, sulfite, bisulfite, phosphate, hydrogen phosphate, dihydrogen phosphate, diphosphate, triphosphate, phosphite, chloride, chlorate, bromide, bromate, iodide, iodate, carbonate, bicarbonate, and the corresponding acids and salts of the aforementioned inorganic anions, j. ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

Further details regarding the at least bidentate organic compounds and the mono-dentate substances, from which the ligands of the framework material as used in the present application are derived, can be taken from EP-A 0 790 253, whose respective content is incorporated into the present application by reference.

Within the present application, framework materials of the kind described herein, which comprise $Zn^{2+}$ as a metal ion and ligands derived from terephthalic acid as the bidentate compound, are particularly preferred. Said framework materials are known as MOF-5 in the literature.

Further metal ions and at least bidentate organic compounds and mono-dentate substances, which are respectively useful for the preparation of the framework materials used in the present invention as well as processes for their preparation are particularly disclosed in EP-A 0 790 253, U.S. Pat. No. 5,648,508 and DE 10111230.0.

As solvents, which are particularly useful for the preparation of MOF-5, in addition to the solvents disclosed in the above-referenced literature, dimethyl formamide, diethyl formamide and N-methylpyrrollidone, alone, in combination with each other or in combination with other solvents may be used. Within the preparation of the framework materials, particularly within the preparation of MOF-5, the solvents and mother liquors are recycled after crystallization in order to save costs and materials.

The pore sizes of the metal-organic framework can be adjusted by selecting suitable organic ligands and/or bidendate compounds (=linkers). Generally, the larger the linker, the larger the pore size. Any pore size that is still supported by a the metal-organic framework in the absence of a host and at temperatures of at least 200° C. is conceivable. Pore sizes ranging from 0.2 nm to 30 nm are preferred, with pore sizes ranging from 0.3 nm to 3 nm being particularly preferred.

In the following, examples of metal-organic framework materials (MOFs) are given to illustrate the general concept given above. These specific examples, however, are not meant to limit the generality and scope of the present application.

By way of example, a list of metal-organic framework materials already synthesized and characterized is given below. This also includes novel isoreticular metal organic framework materials (IR-MOFs), which may be used in the context of the present application. Such materials having the same framework topology while displaying different pore sizes and crystal densities are described, for example in M. Eddouadi et al., *Science* 295 (2002) 469, whose respective content is incorporated into the present application by reference.

The solvents used are of particular importance for the synthesis of these materials and are therefore mentioned in the table. The values for the cell parameters (angles α, β and γ as well as the spacings a, b and c, given in Angstrom) have been obtained by x-ray diffraction and represent the space group given in the table as well.

| MOF-n | Ingredients molar ratios M + L | Solvents | α | β | γ | a | b | c | Space Group |
|---|---|---|---|---|---|---|---|---|---|
| MOF-0 | $Zn(NO_3)_2 \cdot 6H_2O$<br>$H_3(BTC)$ | ethanol | 90 | 90 | 120 | 16.711 | 16.711 | 14.189 | P6(3)/Mcm |
| MOF-2 | $Zn(NO_3)_2 \cdot 6H_2O$<br>(0.246 mmol)<br>$H_2(BDC)$<br>0.241 mmol | DMF<br>toluene | 90 | 102.8 | 90 | 6.718 | 15.49 | 12.43 | P2(1)/n |
| MOF-3 | $Zn(NO_3)_2 \cdot 6H_2O$<br>(1.89 mmol)<br>$H_2(BDC)$<br>(1.93 mmol) | DMF<br>MeOH | 99.72 | 111.11 | 108.4 | 9.726 | 9.911 | 10.45 | P-1 |
| MOF-4 | $Zn(NO_3)_2 \cdot 6H_2O$<br>(1.00 mmol)<br>$H_3(BTC)$<br>(0.5 mmol) | ethanol | 90 | 90 | 90 | 14.728 | 14.728 | 14.728 | P2(1)3 |
| MOF-5 | $Zn(NO_3)_2 \cdot 6H_2O$<br>(2.22 mmol)<br>$H_2(BDC)$<br>(2.17 mmol) | DMF<br>chloro-<br>benzene | 90 | 90 | 90 | 25.669 | 25.669 | 25.669 | Fm-3m |
| MOF-38 | $Zn(NO_3)_2 \cdot 6H_2O$<br>(0.27 mmol)<br>$H_3(BTC)$<br>(0.15 mmol) | DMF<br>chloro-<br>benzene | 90 | 90 | 90 | 20.657 | 20.657 | 17.84 | I4cm |
| MOF-31<br>$Zn(ADC)_2$ | $Zn(NO_3)_2 \cdot 6H_2O$<br>0.4 mmol<br>$H_2(ADC)$<br>0.8 mmol | ethanol | 90 | 90 | 90 | 10.821 | 10.821 | 10.821 | Pn(-3)m |
| MOF-12<br>$Zn_2(ATC)$ | $Zn(NO_3)_2 \cdot 6H_2O$<br>0.3 mmol<br>$H_4(ATC)$<br>0.15 mmol | ethanol | 90 | 90 | 90 | 15.745 | 16.907 | 18.167 | Pbca |
| MOF-20<br>ZnNDC | $Zn(NO_3)_2 \cdot 6H_2O$<br>0.37 mmol<br>$H_2NDC$<br>0.36 mmol | DMF<br>chloro-<br>benzene | 90 | 92.13 | 90 | 8.13 | 16.444 | 12.807 | P2(1)/c |
| MOF-37 | $Zn(NO_3)_2 \cdot 6H_2O$<br>0.2 mmol<br>$H_2NDC$<br>0.2 mmol | DEF<br>chloro-<br>benzene | 72.38 | 83.16 | 84.33 | 9.952 | 11.576 | 15.556 | P-1 |
| MOF-8<br>$Tb_2(ADC)$ | $Tb(NO_3)_3 \cdot 5H_2O$<br>0.10 mmol<br>$H_2ADC$<br>0.20 mmol | DMSO<br>MeOH | 90 | 115.7 | 90 | 19.83 | 9.822 | 19.183 | C2/c |
| MOF-9<br>$Tb_2(ADC)$ | $Tb(NO_3)_3 \cdot 5H_2O$<br>0.08 mmol<br>$H_2ADB$<br>0.12 mmol | DMSO | 90 | 102.09 | 90 | 27.056 | 16.795 | 28.139 | C2/c |
| MOF-6 | $Tb(NO_3)_3 \cdot 5H_2O$<br>0.30 mmol<br>$H_2(BDC)$<br>0.30 mmol | DMF<br>MeOH | 90 | 91.28 | 90 | 17.599 | 19.996 | 10.545 | P21/c |
| MOF-7 | $Tb(NO_3)_3 \cdot 5H_2O$<br>0.15 mmol<br>$H_2(BDC)$<br>0.15 mmol | $H_2O$ | 102.3 | 91.12 | 101.5 | 6.142 | 10.069 | 10.096 | P-1 |
| MOF-69A | $Zn(NO_3)_2 \cdot 6H_2O$<br>0.083 mmol<br>4,4'BPDC<br>0.041 mmol | DEF<br>$H_2O_2$<br>$MeNH_2$ | 90 | 111.6 | 90 | 23.12 | 20.92 | 12 | C2/c |

-continued

| MOF-n | Ingredients molar ratios M + L | Solvents | α | β | γ | a | b | c | Space Group |
|---|---|---|---|---|---|---|---|---|---|
| MOF-69B | $Zn(NO_3)_2.6H_2O$ 0.083 mmol 2,6-NCD 0.041 mmol | DEF $H_2O_2$ $MeNH_2$ | 90 | 95.3 | 90 | 20.17 | 18.55 | 12.16 | C2/c |
| MOF-11 $Cu_2(ATC)$ | $Cu(NO_3)_2.2.5H_2O$ 0.47 mmol $H_2ATC$ 0.22 mmol | $H_2O$ | 90 | 93.86 | 90 | 12.987 | 11.22 | 11.336 | C2/c |
| MOF-11 $Cu_2(ATC)$ dehydr. | | | 90 | 90 | 90 | 8.4671 | 8.4671 | 14.44 | P42/mmc |
| MOF-14 $Cu_3(BTB)$ | $Cu(NO_3)_2.2.5H_2O$ 0.28 mmol $H_3BTB$ 0.052 mmol | $H_2O$ DMF EtOH | 90 | 90 | 90 | 26.946 | 26.946 | 26.946 | Im-3 |
| MOF-32 Cd(ATC) | $Cd(NO_3)_2.4H_2O$ 0.24 mmol $H_4ATC$ 0.10 mmol | $H_2O$ NaOH | 90 | 90 | 90 | 13.468 | 13.468 | 13.468 | P(−4)3m |
| MOF-33 $Zn_2(ATB)$ | $ZnCl_2$ 0.15 mmol $H_4ATB$ 0.02 mmol | $H_2O$ DMF EtOH | 90 | 90 | 90 | 19.561 | 15.255 | 23.404 | Imma |
| MOF-34 Ni(ATC) | $Ni(NO_3)_2.6H_2O$ 0.24 mmol $H_4ATC$ 0.10 mmol | $H_2O$ NaOH | 90 | 90 | 90 | 10.066 | 11.163 | 19.201 | $P2_12_12_1$ |
| MOF-36 $Zn_2(MTB)$ | $Zn(NO_3)_2.4H_2O$ 0.20 mmol $H_4MTB$ 0.04 mmol | $H_2O$ DMF | 90 | 90 | 90 | 15.745 | 16.907 | 18.167 | Pbca |
| MOF-39 $Zn_3O(HBTB)$ | $Zn(NO_3)_2.4H_2O$ 0.27 mmol $H_3BTB$ 0.07 mmol | $H_2O$ DMF EtOH | 90 | 90 | 90 | 17.158 | 21.591 | 25.308 | Pnma |
| NO305 | $FeCl_2.4H_2O$ 5.03 mmol formic acid 86.90 mmol | DMF | 90 | 90 | 120 | 8.2692 | 8.2692 | 63.566 | R-3c |
| NO306A | $FeCl_2.4H_2O$ 5.03 mmol formic acid 86.90 mmol | DEF | 90 | 90 | 90 | 9.9364 | 18.374 | 18.374 | Pbcn |
| NO29 MOF-0 like | $Mn(Ac)_2.4H_2O$ 0.46 mmol $H_3BTC$ 0.69 mmol | DMF | 120 | 90 | 90 | 14.16 | 33.521 | 33.521 | P-1 |
| BPR48A2 | $Zn(NO_3)_2.6H_2O$ 0.012 mmol $H_2BDC$ 0.012 mmol | DMSO toluene | 90 | 90 | 90 | 14.5 | 17.04 | 18.02 | Pbca |
| BPR69 B1 | $Cd(NO_3)_2.4H_2O$ 0.0212 mmol $H_2BDC$ 0.0428 mmol | DMSO | 90 | 98.76 | 90 | 14.16 | 15.72 | 17.66 | Cc |
| BPR92A2 | $Co(NO_3)_2.6H_2O$ 0.018 mmol $H_2BDC$ 0.018 mmol | NMP | 106.3 | 107.63 | 107.2 | 7.5308 | 10.942 | 11.025 | P1 |
| BPR95 C5 | $Cd(NO_3)_2.4H_2O$ 0.012 mmol $H_2BDC$ 0.36 mmol | NMP | 90 | 112.8 | 90 | 14.460 | 11.085 | 15.829 | P2(1)/n |
| Cu $C_6H_4O_6$ | $Cu(NO_3)_2.2.5H_2O$ 0.370 mmol $H_2BDC(OH)_2$ 0.37 mmol | DMF chlorobenzene | 90 | 105.29 | 90 | 15.259 | 14.816 | 14.13 | P2(1)/c |
| M(BTC) MOF-0 like | $Co(SO_4).H_2O$ 0.055 mmol $H_3BTC$ 0.037 mmol | DMF | | Same as MOF-0 | | | | | |
| $Tb(C_6H_4O_6)$ | $Tb(NO_3)_3.5H_2O$ 0.370 mmol $H_2(C_6H_4O_6)$ 0.56 mmol | DMF chlorobenzene | 104.6 | 107.9 | 97.147 | 10.491 | 10.981 | 12.541 | P-1 |

-continued

| MOF-n | Ingredients molar ratios M + L | Solvents | α | β | γ | a | b | c | Space Group |
|---|---|---|---|---|---|---|---|---|---|
| Zn (C₂O₄) | ZnCl₂ 0.370 mmol oxalic acid 0.37 mmol | DMF chlorobenzene | 90 | 120 | 90 | 9.4168 | 9.4168 | 8.464 | P(−3)1m |
| Co(CHO) | Co(NO₃)₂.5H₂O 0.043 mmol formic acid 1.60 mmol | DMF | 90 | 91.32 | 90 | 11.328 | 10.049 | 14.854 | P2(1)/n |
| Cd(CHO) | Cd(NO₃)₂.4H₂O 0.185 mmol formic acid 0.185 mmol | DMF | 90 | 120 | 90 | 8.5168 | 8.5168 | 22.674 | R-3c |
| Cu(C₃H₂O₄) | Cu(NO₃)₂.2.5H₂O 0.043 mmol malonic acid 0.192 mmol | DMF | 90 | 90 | 90 | 8.366 | 8.366 | 11.919 | P43 |
| Zn₆(NDC)₅ MOF-48 | Zn(NO₃)₂.6H₂O 0.097 mmol 14 NDC 0.069 mmol | DMF chlorobenzene H₂O₂ | 90 | 95.902 | 90 | 19.504 | 16.482 | 14.64 | C2/m |
| MOF-47 | Zn(NO₃)₂.6H₂O 0.185 mmol H₂(BDC[CH₃]₄) 0.185 mmol | DMF chlorobenzene H₂O₂ | 90 | 92.55 | 90 | 11.303 | 16.029 | 17.535 | P2(1)/c |
| MO25 | Cu(NO₃)₂.2.5H₂O 0.084 mmol BPhDC 0.085 mmol | DMF | 90 | 112.0 | 90 | 23.880 | 16.834 | 18.389 | P2(1)/c |
| Cu-Thio | Cu(NO₃)₂.2.5H₂O 0.084 mmol thiophene dicarboxylic 0.085 mmol | DEF | 90 | 113.6 | 90 | 15.4747 | 14.514 | 14.032 | P2(1)/c |
| C1BDC1 | Cu(NO₃)₂.2.5H₂O 0.084 mmol H₂(BDCCl₂) 0.085 mmol | DMF | 90 | 105.6 | 90 | 14.911 | 15.622 | 18.413 | C2/c |
| MOF-101 | Cu(NO₃)₂.2.5H₂O 0.084 mmol BrBDC 0.085 mmol | DMF | 90 | 90 | 90 | 21.607 | 20.607 | 20.073 | Fm3m |
| Zn₃(BTC)₂ | ZnCl₂ 0.033 mmol H₃BTC 0.033 mmol | DMF EtOH base added | 90 | 90 | 90 | 26.572 | 26.572 | 26.572 | Fm-3m |
| MOF-j | Co(CH₃CO₂)₂.4H₂O (1.65 mmol) H₃(BZC) (0.95 mmol) | H₂O | 90 | 112.0 | 90 | 17.482 | 12.963 | 6.559 | C2 |
| MOF-n | Zn(NO₃)₂.6H₂O H₃(BTC) | ethanol | 90 | 90 | 120 | 16.711 | 16.711 | 14.189 | P6(3)/mcm |
| PbBDC | Pb(NO₃)₂ (0.181 mmol) H₂(BDC) (0.181 mmol) | DMF ethanol | 90 | 102.7 | 90 | 8.3639 | 17.991 | 9.9617 | P2(1)/n |
| Znhex | Zn(NO₃)₂.6H₂O (0.171 mmol) H₃BTB (0.114 mmol) | DMF p-xylene ethanol | 90 | 90 | 120 | 37.1165 | 37.117 | 30.019 | P3(1)c |
| AS16 | FeBr₂ 0.927 mmol H₂(BDC) 0.927 mmol | DMF anhydr. | 90 | 90.13 | 90 | 7.2595 | 8.7894 | 19.484 | P2(1)c |
| AS27-2 | FeBr₂ 0.927 mmol H₃(BDC) 0.464 mmol | DMF anhydr. | 90 | 90 | 90 | 26.735 | 26.735 | 26.735 | Fm3m |
| AS32 | FeCl₃ 1.23 mmol H₂(BDC) 1.23 mmol | DMF anhydr. ethanol | 90 | 90 | 120 | 12.535 | 12.535 | 18.479 | P6(2)c |
| AS54-3 | FeBr₂ 0.927 BPDC 0.927 mmol | DMF anhydr. n-propanol | 90 | 109.98 | 90 | 12.019 | 15.286 | 14.399 | C2 |

-continued

| MOF-n | Ingredients molar ratios M + L | Solvents | α | β | γ | a | b | c | Space Group |
|---|---|---|---|---|---|---|---|---|---|
| AS61-4 | FeBr$_2$ 0.927 mmol m-BDC 0.927 mmol | pyridine anhydr. | 90 | 90 | 120 | 13.017 | 13.017 | 14.896 | P6(2)c |
| AS68-7 | FeBr$_2$ 0.927 mmol m-BDC 1.204 mmol | DMF anhydr. Pyridine | 90 | 90 | 90 | 18.3407 | 10.036 | 18.039 | Pca2$_1$ |
| Zn(ADC) | Zn(NO$_3$)$_2$.6H$_2$O 0.37 mmol H$_2$(ADC) 0.36 mmol | DMF chloro-benzene | 90 | 99.85 | 90 | 16.764 | 9.349 | 9.635 | C2/c |
| MOF-12 Zn$_2$(ATC) | Zn(NO$_3$)$_2$.6H$_2$O 0.30 mmol H$_4$(ATC) 0.15 mmol | ethanol | 90 | 90 | 90 | 15.745 | 16.907 | 18.167 | Pbca |
| MOF-20 ZnNDC | Zn(NO$_3$)$_2$.6H$_2$O 0.37 mmol H$_2$NDC 0.36 mmol | DMF chloro-benzene | 90 | 92.13 | 90 | 8.13 | 16.444 | 12.807 | P2(1)/c |
| MOF-37 | Zn(NO$_3$)$_2$.6H$_2$O 0.20 mmol H$_2$NDC 0.20 mmol | DEF chloro-benzene | 72.38 | 83.16 | 84.33 | 9.952 | 11.576 | 15.556 | P-1 |
| Zn(NDC) (DMSO) | Zn(NO$_3$)$_2$.6H$_2$O H$_2$NDC | DMSO | 68.08 | 75.33 | 88.31 | 8.631 | 10.207 | 13.114 | P-1 |
| Zn(NDC) | Zn(NO$_3$)$_2$.6H$_2$O H$_2$NDC | | 90 | 99.2 | 90 | 19.289 | 17.628 | 15.052 | C2/c |
| Zn(HPDC) | Zn(NO$_3$)$_2$.4H$_2$O 0.23 mmol H$_2$(HPDC) 0.05 mmol | DMF H$_2$O | 107.9 | 105.06 | 94.4 | 8.326 | 12.085 | 13.767 | P-1 |
| Co(HPDC) | Co(NO$_3$)$_2$.6H$_2$O 0.21 mmol H$_2$(HPDC) 0.06 mmol | DMF H$_2$O/ ethanol | 90 | 97.69 | 90 | 29.677 | 9.63 | 7.981 | C2/c |
| Zn$_3$(PDC)2.5 | Zn(NO$_3$)$_2$.4H$_2$O 0.17 mmol H$_2$(HPDC) 0.05 mmol | DMF/ ClBz H$_2$O/ TEA | 79.34 | 80.8 | 85.83 | 8.564 | 14.046 | 26.428 | P-1 |
| Cd$_2$(TPDC)2 | Cd(NO$_3$)$_2$.4H$_2$O 0.06 mmol H$_2$(HPDC) 0.06 mmol | methanol/ CHP H$_2$O | 70.59 | 72.75 | 87.14 | 10.102 | 14.412 | 14.964 | P-1 |
| Tb(PDC)1.5 | Tb(NO$_3$)$_3$.5H$_2$O 0.21 mmol H$_2$(PDC) 0.034 mmol | DMF H$_2$O/ ethanol | 109.8 | 103.61 | 100.14 | 9.829 | 12.11 | 14.628 | P-1 |
| ZnDBP | Zn(NO$_3$)$_2$.6H$_2$O 0.05 mmol dibenzylphosphate 0.10 mmol | MeOH | 90 | 93.67 | 90 | 9.254 | 10.762 | 27.93 | P2/n |
| Zn$_3$(BPDC) | ZnBr$_2$ 0.021 mmol 4,4'BPDC 0.005 mmol | DMF | 90 | 102.76 | 90 | 11.49 | 14.79 | 19.18 | P21/n |
| CdBDC | Cd(NO$_3$)$_2$.4H$_2$O 0.100 mmol H$_2$(BDC) 0.401 mmol | DMF Na$_2$SiO$_3$ (aq) | 90 | 95.85 | 90 | 11.2 | 11.11 | 16.71 | P21/n |
| Cd-mBDC | Cd(NO$_3$)$_2$.4H$_2$O 0.009 mmol H$_2$(mBDC) 0.018 mmol | DMF MeNH$_2$ | 90 | 101.1 | 90 | 13.69 | 18.25 | 14.91 | C2/c |
| Zn$_4$OBNDC | Zn(NO$_3$)$_2$.6H$_2$O 0.041 mmol BNDC | DEF MeNH$_2$ H$_2$O$_2$ | 90 | 90 | 90 | 22.35 | 26.05 | 59.56 | Fmmm |
| Eu(TCA) | Eu(NO$_3$)$_3$.6H$_2$O 0.14 mmol TCA 0.026 mmol | DMF chloro-benzene | 90 | 90 | 90 | 23.325 | 23.325 | 23.325 | Pm-3n |
| Tb(TCA) | Tb(NO$_3$)$_3$.6H$_2$O 0.069 mmol TCA 0.026 mmol | DMF chloro-benzene | 90 | 90 | 90 | 23.272 | 23.272 | 23.372 | Pm-3n |

-continued

| MOF-n | Ingredients molar ratios M + L | Solvents | α | β | γ | a | b | c | Space Group |
|---|---|---|---|---|---|---|---|---|---|
| Formate | Ce(NO₃)₃.6H₂O 0.138 mmol Formaic acid 0.43 mmol | H₂O ethanol | 90 | 90 | 120 | 10.668 | 10.667 | 4.107 | R-3m |
| | FeCl₂.4H₂O 5.03 mmol Formic acid 86.90 mmol | DMF | 90 | 90 | 120 | 8.2692 | 8.2692 | 63.566 | R-3c |
| | FeCl₂.4H₂O 5.03 mmol Formic acid 86.90 mmol | DEF | 90 | 90 | 90 | 9.9364 | 18.374 | 18.374 | Pbcn |
| | FeCl₂.4H₂O 5.03 mmol Formic acid 86.90 mmol | DEF | 90 | 90 | 90 | 8.335 | 8.335 | 13.34 | P-31c |
| NO330 | FeCl₂.4H₂O 0.50 mmol Formic acid 8.69 mmol | form-amide | 90 | 90 | 90 | 8.7749 | 11.655 | 8.3297 | Pnna |
| NO332 | FeCl₂.4H₂O 0.50 mmol Formic acid 8.69 mmol | DIP | 90 | 90 | 90 | 10.0313 | 18.808 | 18.355 | Pbcn |
| NO333 | FeCl₂.4H₂O 0.50 mmol Formic acid 8.69 mmol | DBF | 90 | 90 | 90 | 45.2754 | 23.861 | 12.441 | Cmcm |
| NO335 | FeCl₂.4H₂O 0.50 mmol Formic acid 8.69 mmol | CHF | 90 | 91.372 | 90 | 11.5964 | 10.187 | 14.945 | P21/n |
| NO336 | FeCl₂.4H₂O 0.50 mmol Formic acid 8.69 mmol | MFA | 90 | 90 | 90 | 11.7945 | 48.843 | 8.4136 | Pbcm |
| NO13 | Mn(Ac)₂.4H₂O 0.46 mmol Bezoic acid 0.92 mmol Bipyridine 0.46 mmol | ethanol | 90 | 90 | 90 | 18.66 | 11.762 | 9.418 | Pbcn |
| NO29 MOF-0 like | Mn(Ac)₂.4H₂O 0.46 mmol H₃BTC 0.69 mmol | DMF | 120 | 90 | 90 | 14.16 | 33.521 | 33.521 | P-1 |
| Mn(hfac)₂ (O₂CC₆H₅) | Mn(Ac)₂.4H₂O 0.46 mmol Hfac 0.92 mmol Bipyridine 0.46 mmol | ether | 90 | 95.32 | 90 | 9.572 | 17.162 | 14.041 | C2/c |
| BPR43G2 | Zn(NO₃)₂.6H₂O 0.0288 mmol H₂BDC 0.0072 mmol | DMF CH₃CN | 90 | 91.37 | 90 | 17.96 | 6.38 | 7.19 | C2/c |
| BPR48A2 | Zn(NO₃)₂.6H₂O 0.012 mmol H₂BDC 0.012 mmol | DMSO toluene | 90 | 90 | 90 | 14.5 | 17.04 | 18.02 | Pbca |
| BPR49B1 | Zn(NO₃)₂.6H₂O 0.024 mmol H₂BDC 0.048 mmol | DMSO methanol | 90 | 91.172 | 90 | 33.181 | 9.824 | 17.884 | C2/c |
| BPR56E1 | Zn(NO₃)₂.6H₂O 0.012 mmol H₂BDC 0.024 mmol | DMSO n-propanol | 90 | 90.096 | 90 | 14.5873 | 14.153 | 17.183 | P2(1)/n |
| BPR68D10 | Zn(NO₃)₂.6H₂O 0.0016 mmol H₃BTC 0.0064 mmol | DMSO benzene | 90 | 95.316 | 90 | 10.0627 | 10.17 | 16.413 | P2(1)/c |

-continued

| MOF-n | Ingredients molar ratios M + L | Solvents | α | β | γ | a | b | c | Space Group |
|---|---|---|---|---|---|---|---|---|---|
| BPR69B1 | $Cd(NO_3)_2.4H_2O$ 0.0212 mmol $H_2BDC$ 0.0428 mmol | DMSO | 90 | 98.76 | 90 | 14.16 | 15.72 | 17.66 | Cc |
| BPR73E4 | $Cd(NO_3)_2.4H_2O$ 0.006 mmol $H_2BDC$ 0.003 mmol | DMSO toluene | 90 | 92.324 | 90 | 8.7231 | 7.0568 | 18.438 | P2(1)/n |
| BPR76D5 | $Zn(NO_3)_2.6H_2O$ 0.0009 mmol $H_2BzPDC$ 0.0036 mmol | DMSO | 90 | 104.17 | 90 | 14.4191 | 6.2599 | 7.0611 | Pc |
| BPR80B5 | $Cd(NO_3)_2.4H_2O$ 0.018 mmol $H_2BDC$ 0.036 mmol | DMF | 90 | 115.11 | 90 | 28.049 | 9.184 | 17.837 | C2/c |
| BPR80H5 | $Cd(NO_3)_2.4H_2O$ 0.027 mmol $H_2BDC$ 0.027 mmol | DMF | 90 | 119.06 | 90 | 11.4746 | 6.2151 | 17.268 | P2/c |
| BPR82C6 | $Cd(NO_3)_2.4H_2O$ 0.0068 mmol $H_2BDC$ 0.202 mmol | DMF | 90 | 90 | 90 | 9.7721 | 21.142 | 27.77 | Fdd2 |
| BPR86C3 | $Co(NO_3)_2.6H_2O$ 0.0025 mmol $H_2BDC$ 0.075 mmol | DMF | 90 | 90 | 90 | 18.3449 | 10.031 | 17.983 | Pca2(1) |
| BPR86H6 | $Cd(NO_3)_2.4H_2O$ 0.010 mmol $H_2BDC$ 0.010 mmol | DMF | 80.98 | 89.69 | 83.412 | 9.8752 | 10.263 | 15.362 | P-1 |
|  | $Co(NO_3)_2.6H_2O$ | NMP | 106.3 | 107.63 | 107.2 | 7.5308 | 10.942 | 11.025 | P1 |
| BPR95A2 | $Zn(NO_3)_2.6H_2O$ 0.012 mmol $H_2BDC$ 0.012 mmol | NMP | 90 | 102.9 | 90 | 7.4502 | 13.767 | 12.713 | P2(1)/c |
| $CuC_6F_4O_4$ | $Cu(NO_3)_2.2.5H_2O$ 0.370 mmol $H_2BDC(OH)2$ 0.37 mmol | DMF chloro- benzene | 90 | 98.834 | 90 | 10.9675 | 24.43 | 22.553 | P2(1)/n |
| Fe Formic | $FeCl_2.4H_2O$ 0.370 mmol Formic acid 0.37 mmol | DMF | 90 | 91.543 | 90 | 11.495 | 9.963 | 14.48 | P2(1)/n |
| Mg Formic | $Mg(NO_3)_2.6H_2O$ 0.370 mmol Formic acid 0.37 mmol | DMF | 90 | 91.359 | 90 | 11.383 | 9.932 | 14.656 | P2(1)/n |
| $MgC_6H_4O_6$ | $Mg(NO_3)_2.6H_2O$ 0.370 mmol $H_2BDC(OH)_2$ 0.37 mmol | DMF | 90 | 96.624 | 90 | 17.245 | 9.943 | 9.273 | C2/c |
| Zn $C_2H_4BDC$ MOF-38 | $ZnCl_2$ 0.44 mmol CBBDC 0.261 mmol | DMF | 90 | 94.714 | 90 | 7.3386 | 16.834 | 12.52 | P2(1)/n |
| MOF-49 | $ZnCl_2$ 0.44 mmol m-BDC 0.261 mmol | DMF CH3CN | 90 | 93.459 | 90 | 13.509 | 11.984 | 27.039 | P2/c |
| MOF-26 | $Cu(NO_3)_2.5H_2O$ 0.084 mmol DCPE 0.085 mmol | DMF | 90 | 95.607 | 90 | 20.8797 | 16.017 | 26.176 | P2(1)/n |
| MOF-112 | $Cu(NO_3)_2.2.5H_2O$ 0.084 mmol o-Br-m-BDC 0.085 mmol | DMF ethanol | 90 | 107.49 | 90 | 29.3241 | 21.297 | 18.069 | C2/c |
| MOF-109 | $Cu(NO_3)_2.2.5H_2O$ 0.084 mmol KDB 0.085 mmol | DMF | 90 | 111.98 | 90 | 23.8801 | 16.834 | 18.389 | P2(1)/c |

-continued

| MOF-n | Ingredients molar ratios M + L | Solvents | α | β | γ | a | b | c | Space Group |
|---|---|---|---|---|---|---|---|---|---|
| MOF-111 | Cu(NO$_3$)$_2$.2.5H$_2$O 0.084 mmol o-BrBDC 0.085 mmol | DMF ethanol | 90 | 102.16 | 90 | 10.6767 | 18.781 | 21.052 | C2/c |
| MOF-110 | Cu(NO$_3$)$_2$.2.5H$_2$O 0.084 mmol thiophene dicarboxylic 0.085 mmol | DMF | 90 | 90 | 120 | 20.0652 | 20.065 | 20.747 | R-3/m |
| MOF-107 | Cu(NO$_3$)$_2$.2.5H$_2$O 0.084 mmol thiophene dicarboxylic 0.085 mmol | DEF | 104.8 | 97.075 | 95.206 | 11.032 | 18.067 | 18.452 | P-1 |
| MOF-108 | Cu(NO$_3$)$_2$.2.5H$_2$O 0.084 mmol thiophene dicarboxylic 0.085 mmol | DBF/ methanol | 90 | 113.63 | 90 | 15.4747 | 14.514 | 14.032 | C2/c |
| MOF-102 | Cu(NO$_3$)$_2$.2.5H$_2$O 0.084 mmol H$_2$(BDCCl$_2$) 0.085 mmol | DMF | 91.63 | 106.24 | 112.01 | 9.3845 | 10.794 | 10.831 | P-1 |
| Clbdcl | Cu(NO$_3$)$_2$.2.5H$_2$O 0.084 mmol H$_2$(BDCCl$_2$) 0.085 mmol | DEF | 90 | 105.56 | 90 | 14.911 | 15.622 | 18.413 | P-1 |
| Cu(NMOP) | Cu(NO$_3$)$_2$.2.5H$_2$O 0.084 mmol NBDC 0.085 mmol | DMF | 90 | 102.37 | 90 | 14.9238 | 18.727 | 15.529 | P2(1)/m |
| Tb(BTC) | Tb(NO$_3$)$_3$.5H$_2$O 0.033 mmol H$_3$BTC 0.033 mmol | DMF | 90 | 106.02 | 90 | 18.6986 | 11.368 | 19.721 | |
| Zn$_3$(BTC)$_2$ Honk | ZnCl$_2$ 0.033 mmol H$_3$BTC 0.033 mmol | DMF ethanol | 90 | 90 | 90 | 26.572 | 26.572 | 26.572 | Fm-3m |
| Zn$_4$O(NDC) | Zn(NO$_3$)$_2$.4H$_2$O 0.066 mmol 14NDC 0.066 mmol | DMF ethanol | 90 | 90 | 90 | 41.5594 | 18.818 | 17.574 | aba2 |
| CdTDC | Cd(NO$_3$)$_2$.4H$_2$O 0.014 mmol thiophene 0.040 mmol DABCO 0.020 mmol | DMF H$_2$O | 90 | 90 | 90 | 12.173 | 10.485 | 7.33 | Pmma |
| IRMOF-2 | Zn(NO$_3$)$_2$.4H$_2$O 0.160 mmol o-Br-BDC 0.60 mmol | DEF | 90 | 90 | 90 | 25.772 | 25.772 | 25.772 | Fm-3m |
| IRMOF-3 | Zn(NO$_3$)$_2$.4H$_2$O 0.20 mmol H$_2$N—BDC 0.60 mmol | DEF ethanol | 90 | 90 | 90 | 25.747 | 25.747 | 25.747 | Fm-3m |
| IRMOF-4 | Zn(NO$_3$)$_2$.4H$_2$O 0.11 mmol [C$_3$H$_7$O]$_2$—BDC 0.48 mmol | DEF | 90 | 90 | 90 | 25.849 | 25.849 | 25.849 | Fm-3m |
| IRMOF-5 | Zn(NO$_3$)$_2$.4H$_2$O 0.13 mmol [C$_5$H$_{11}$O]$_2$—BDC 0.50 mmol | DEF | 90 | 90 | 90 | 12.882 | 12.882 | 12.882 | Pm-3m |
| IRMOF-6 | Zn(NO$_3$)$_2$.4H$_2$O 0.20 mmol [C$_2$H$_4$]—BDC 0.60 mmol | DEF | 90 | 90 | 90 | 25.842 | 25.842 | 25.842 | Fm-3m |
| IRMOF-7 | Zn(NO$_3$)$_2$.4H$_2$O 0.07 mmol 1,4NDC 0.20 mmol | DEF | 90 | 90 | 90 | 12.914 | 12.914 | 12.914 | Pm-3m |

-continued

| MOF-n | Ingredients molar ratios M + L | Solvents | α | β | γ | a | b | c | Space Group |
|---|---|---|---|---|---|---|---|---|---|
| IRMOF-8 | Zn(NO$_3$)$_2$·4H$_2$O 0.55 mmol 2,6NDC 0.42 mmol | DEF | 90 | 90 | 90 | 30.092 | 30.092 | 30.092 | Fm-3m |
| IRMOF-9 | Zn(NO$_3$)$_2$·4H$_2$O 0.05 mmol BPDC 0.42 mmol | DEF | 90 | 90 | 90 | 17.147 | 23.322 | 25.255 | Pnnm |
| IRMOF-10 | Zn(NO$_3$)$_2$·4H$_2$O 0.02 mmol BPDC 0.012 mmol | DEF | 90 | 90 | 90 | 34.281 | 34.281 | 34.281 | Fm-3m |
| IRMOF-11 | Zn(NO$_3$)$_2$·4H$_2$O 0.05 mmol HPDC 0.20 mmol | DEF | 90 | 90 | 90 | 24.822 | 24.822 | 56.734 | R-3m |
| IRMOF-12 | Zn(NO$_3$)$_2$·4H$_2$O 0.017 mmol HPDC 0.12 mmol | DEF | 90 | 90 | 90 | 34.281 | 34.281 | 34.281 | Fm-3m |
| IRMOF-13 | Zn(NO$_3$)$_2$·4H$_2$O 0.048 mmol PDC 0.31 mmol | DEF | 90 | 90 | 90 | 24.822 | 24.822 | 56.734 | R-3m |
| IRMOF-14 | Zn(NO$_3$)$_2$·4H$_2$O 0.17 mmol PDC 0.12 mmol | DEF | 90 | 90 | 90 | 34.381 | 34.381 | 34.381 | Fm-3m |
| IRMOF-15 | Zn(NO$_3$)$_2$·4H$_2$O 0.063 mmol TPDC 0.025 mmol | DEF | 90 | 90 | 90 | 21.459 | 21.459 | 21.459 | Im-3m |
| IRMOF-16 | Zn(NO$_3$)$_2$·4H$_2$O 0.0126 mmol TPDC 0.05 mmol | DEF NMP | 90 | 90 | 90 | 21.49 | 21.49 | 21.49 | Pm-3m |

| | |
|---|---|
| ADC | Acetylene dicarboxylic acid |
| NDC | Naphtalene dicarboxylic acid |
| BDC | Benzene dicarboxylic acid |
| ATC | Adamantane tetracarboxylic acid |
| BTC | Benzene tricarboxylic acid |
| BTB | Benzene tribenzoate |
| MTB | Methane tetrabenzoate |
| ATB | Adamantane tetrabenzoate |
| ADB | Adamantane dibenzoate |

Examples of the synthesis of these materials as such can, for example, be found in: J. Am. Chem. Soc. 123 (2001) pages 8241 ff or in Acc. Chem. Res. 31 (1998) pages 474ff, which are fully encompassed within the content of the present application.

The separation of the framework materials, particularly of MOF-5, from the mother liquor of the crystallization may be achieved by procedures known in the art such as solid-liquid separations, centrifugation, extraction, filtration, membrane filtration, cross-flow filtration, flocculation using flocculation adjuvants (non-ionic, cationic and anionic adjuvants) or by the addition of pH shifting additives such as salts, acids or bases, by flotation, as well as by evaporation of the mother liquor at elevated temperature and/or in vacuo and concentrating of the solid. The material obtained in this step is typically a fine powder and is not optimally suited for most practical applications, e.g. in catalysis, where shaped bodies are preferred. Therefore, the powder is pressed or granulated or formed by any process known to the expert in the art, in particular any process that results in forming a powder into a shaped body. Such a process is disclosed, e.g. in the U.S. application Ser. No. 10/157,182.

In a preferred embodiment, the metal-organic framework material catalyst used for the reaction of oxygen and/or oxygen-delivering substances with hydrogen and/or hydrogen-delivering substances contains at least one additional metal selected from the main groups and/or the subgroups of the periodic table of the elements. In a further preferred embodiment, in order to produce said catalyst, the metal-organic framework material as described above is brought in contact with a substance, preferably a powder, a solution or a suspension, containing at least one metal of the main groups or the subgroups of the periodic table of the elements.

The term "bringing in contact" in the context of the present invention refers to any procedure yielding a metal-organic framework catalyst as described above, containing, at least in parts, at least one additional metal component. As far as the methods of bringing the metal-organic framework in contact with an additional metal component, any method known to the expert in the field, in particular any method known in the context of charging a porous material, can be used. In a preferred embodiment, these methods include but are not limited to: dipping, coating, spraying, impregnating, soaking, applying, precipitating, co-precipitating, kneading, powder kneading.

The additional metal is selected form the group consisting of the main group or the subgroup metals of the periodic table of the elements, preferably form the group of the sub group metals, further preferred from the group of Cu, Ag, Au, Fe, Co, Ni, Ru, Rh, Pd, Os, Ir, Pt, particularly preferred from the group of Pd, Pt, Au. Mixtures of at least two of all of the aforementioned substances are included as well.

For the reaction to produce hydrogen peroxide, any substance that contains or delivers oxygen and any substance that contains or delivers hydrogen can be used, so long as, ultimately, hydrogen peroxide is formed in the presence of the catalyst according to the invention. In a preferred embodiment the molecular gases oxygen and hydrogen are used. Either or both gases may be mixed with other reactive gases and/or inert gases, preferably with inert gases.

The invention is now further described by way of the following examples, which are, however, not meant to limit the scope of the present application.

EXAMPLES

Example 1

Preparation of the Metal-Organic Framework Material 41 g of terephthalic acid are dissolved together with 193.5 g of $ZnNO_3.4\ H_2O$ in 5650 g of diethyl formamide in a container with a frit (HWS, 10 liters). The mixture is heated to 130° C. and kept at that temperature for 210 minutes. Subsequently, the mixture is cooled down and the solid formed is filtered off and washed three times with 1 liter of chloroform, respectively. The filter cake is blow dried with nitrogen.

The product thusly obtained is subsequently activated in several portions under high vacuum. The structure of MOF-5 is discernible in the x-ray diffraction pattern.

Example 2

Preparation of the Catalyst

The preparation of the metal-organic framework material containing Pd and used as a catalyst was performed as described in the following: 1.0 g of Pd Acetate (4.45 mmol) are dissolved in 91.5 g of diethyl formamide and 33 g of acetonitrile in a beaker. The brownish solution is filled into a four neck flask containing 5.0 g of the MOF-5 from Example 1. The suspension is cooked in an oil bath at 60° C. for 7 h while being stirred. Subsequently the mixture is transferred into a beaker and the mother liquor is decanted off after the crystals have settled.

The crystals are over-layered with chloroform and, after 12 hours, washed with chloroform until the chloroform solution hardly shows any coloring, then transferred into a flask and dried at room temperature under high vacuum (turbo molecular pump). The yield was 5.7 g. Elemental analysis resulted in a Pd content of 1.6% by weight next to 29.2% by weight of Zn and a residual content of Cl of 220 ppm.

Example 3

Activation of the Inventive Catalyst 54.3 g of the catalyst prepared as described above are transferred into a glass reactor that is fed with 10% by volume of hydrogen in Ar at a flow rate of 30 ml/min. In a temperature-controlled reduction (Autochem II 2920, Micromeritics), the reactor is heated to 250° C. using a ramp of 5 K/min. At a temperature of 92° C., 3.67 ml STP of gas per gram of catalyst are activated in the presence of hydrogen, corresponding to approx. 1.7% by weight of Pd in the catalyst that can be reduced.

Example 4

Preparation of $H_2O_2$ Using the Inventive Catalyst 4 g of the material from Example 3 are mixed with 120 mg of Graphite and pressed into tablets of 4.75 mm over 3 mm using a tabletting apparatus (Korsch).

10 ml of these tablets are exposed to the following feed in a designated pressure container with a basket-like insert: 89 g/h of methanol containing 120 ppm of NaBr, 8 STDl/h of hydrogen and 37.4 STDl/h of oxygen. The liquid medium is stirred at 1500 rpm. A space-time yield of 16 g/l/h with respect to the formation of hydrogen peroxide was measured by means of titration at a temperature of 40° C., a pressure of 50 bar and a running time of 91 hours.

What is claimed as new and is intended to be secured by Letters Patent is:

1. A process for preparing hydrogen peroxide comprising:
   reacting oxygen or an oxygen-delivering substance with hydrogen or a hydrogen delivering substance, in the presence of a catalyst,
   wherein the catalyst comprises a metal-organic framework material having pores and comprising at least one metal ion and at least one at least bidentate organic compound coordinately bound to the metal ion and wherein the metal-organic framework material further comprises at least one additional metal selected from the group consisting of metals of groups Ia, IIa, IIIa, IVa to VIIIa and Ib to IIIb of the periodic table.

2. The process of claim 1, wherein the metal ion of the metal-organic framework catalyst comprises an ion selected from group consisting of $Mg^{2+}$, $Ca^{2+}$, $Sc^{3+}$, $Y^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$, and $Bi^+$.

3. The process of claim 2, wherein the metal ion is $Zn^{2+}$.

4. The process of claim 1, wherein the at least bidentate organic compound has a substructure bound to at least one bidentate functional group, said substructure is selected from the group consisting of alkyl groups, an aryl group having 1 of 2 phenyl rings, and combinations thereof, and said bidentate functional group has at least 2 carboxy groups.

5. The process of claim 1, wherein the at least one additional metal is selected from the group consisting of Pd, Pt, and Au.

6. The process of claim 1, wherein the at least bidentate organic compound is selected from the group consisting of 1,3,5-benzene tricarboxylate, acetylene dicarboxylate, naphtalen dicarboxylate, benzene dicarboxylate, adamantane tetracarboxylate, benzene tricarboxylate, benzene tribenzoate, methane tetrabenzoate, and adamantane tribenzoate.

7. The process of claim 1, wherein said catalyst further comprises at least one monodentate ligand.

8. The process of claim 7, wherein the monodentate ligand is selected from the group consisting of alkyl amines having linear, branched, or cyclic aliphatic groups of from 1 to 20 carbon atoms, and alkyl ammonium salts thereof; aryl amines having from 1 to 5 phenyl rings, and aryl ammonium salts thereof; alkyl phosphonium salts, having linear, branched, or cyclic aliphatic groups of from 1 to 20 carbon atoms; aryl phosphonium salts having from 1 to 5 phenyl rings; alkyl organic acids having linear, branched, or cyclic aliphatic groups of from 1 to 20 carbon atoms, and alkyl organic anions and salts thereof; aryl organic acids having from 1 to 5 phenyl rings, and aryl organic anions and salts thereof; linear, branched, or cyclic aliphatic alcohols having from 1 to 20 carbon atoms; aryl alcohols having from 1 to 5 phenyl rings; inorganic anions of the group consisting of sulfate, nitrate, nitrite, sulfite, bisulfite, phosphate, hydrogen phosphate, dihydrogen phosphate, diphosphate, triphosphate, phosphate, chloride, chlorate, bromide, bromate, iodide, iodate, carbonate, bicarbonate, and acids and salts thereof; and ammonia, carbon dioxide, methane, oxygen, ethylene, hexane, benzene, toluene, xylene, chlorobenzene, nitrobenzene, naphthalene, thiophene, pyridine, acetone, 1-2-dichloroethane, methylenechloride, tetrahydrofuran, ethanolamine, triethylamine and trifluoromethylsulfonic acid.

9. The process of claim 1, wherein the metal ion is $Zn^{2+}$.

10. The process of claim 1, wherein the metal-organic framework material is MOF-5.

11. The process of claim 1, wherein the catalyst has a pore size of from 0.2 to 30 nm.

* * * * *